US008280994B2

(12) United States Patent
Blouin et al.

(10) Patent No.: US 8,280,994 B2
(45) Date of Patent: Oct. 2, 2012

(54) METHOD AND APPARATUS FOR DESIGNING, UPDATING AND OPERATING A NETWORK BASED ON QUALITY OF EXPERIENCE

(75) Inventors: Francois Blouin, Gatineau (CA); Ravishankar Ravindran, Ottawa (CA); Kathy Bharrathsingh, Ottawa (CA)

(73) Assignee: Rockstar Bidco LP, New York, NY (US)

( * ) Notice: Subject to any disclaimer, the term of this patent is extended or adjusted under 35 U.S.C. 154(b) by 655 days.

(21) Appl. No.: 11/978,314

(22) Filed: Oct. 29, 2007

(65) Prior Publication Data

US 2008/0155087 A1 Jun. 26, 2008

Related U.S. Application Data

(60) Provisional application No. 60/854,785, filed on Oct. 27, 2006.

(51) Int. Cl.
 *G06F 15/173* (2006.01)
(52) U.S. Cl. .... 709/223; 709/224; 370/216; 370/395.21
(58) Field of Classification Search .................. 709/223, 709/224, 225; 370/229, 230, 395.21
 See application file for complete search history.

(56) References Cited

U.S. PATENT DOCUMENTS

| | | | | |
|---|---|---|---|---|
| 6,587,433 | B1 * | 7/2003 | Borella et al. | 370/230 |
| 6,785,283 | B1 * | 8/2004 | Stichter | 370/395.42 |
| 7,107,496 | B1 * | 9/2006 | D'Ippolito et al. | 714/46 |
| 7,496,661 | B1 * | 2/2009 | Morford et al. | 709/224 |
| 7,548,539 | B2 * | 6/2009 | Kouretas et al. | 370/356 |
| 7,633,972 | B1 * | 12/2009 | Elliott | 370/474 |
| 2002/0046273 | A1 * | 4/2002 | Lahr et al. | 709/224 |
| 2002/0073222 | A1 * | 6/2002 | Sonoda et al. | 709/232 |
| 2003/0035374 | A1 * | 2/2003 | Carter et al. | 370/235 |
| 2004/0008688 | A1 * | 1/2004 | Matsubara et al. | 370/395.21 |
| 2005/0047396 | A1 * | 3/2005 | Helm et al. | 370/352 |
| 2005/0058145 | A1 * | 3/2005 | Florencio et al. | 370/412 |
| 2005/0089043 | A1 * | 4/2005 | Seckin et al. | 370/395.21 |
| 2005/0169279 | A1 * | 8/2005 | Magd et al. | 370/395.5 |
| 2005/0172016 | A1 * | 8/2005 | Kossi et al. | 709/223 |
| 2006/0034185 | A1 * | 2/2006 | Patzschke et al. | 370/252 |
| 2006/0034336 | A1 * | 2/2006 | Huh et al. | 370/498 |
| 2006/0045019 | A1 * | 3/2006 | Patzschke et al. | 370/241 |

(Continued)

FOREIGN PATENT DOCUMENTS

WO WO 2005022852 A1 * 3/2005

(Continued)

*Primary Examiner* — Wing Chan
*Assistant Examiner* — Kostas Katsikis
(74) *Attorney, Agent, or Firm* — Anderson Gorecki & Manaras LLP

(57) ABSTRACT

A software program/software tools allows end user quality of experience to be quantified and translated into network conditions required to achieve that end user quality of experience. By focusing on the Quality of Experience (QoE) for the applications that will use the network rather than the traditional bottom up approach, and then looking to design the network based on those end user requirements, the network may be designed and/or operated to achieve a high quality of experience. The program and tools may be used at different phases of the networking cycle, including design, planning, deployment, and operational phases, to allow the QoE requirements to be obtained while optimizing network cost and utilization. A QoE server may be implemented off line and used for network design/planning, or may be included on the network to monitor the network and control operation of the network to achieve the intended QoE.

19 Claims, 8 Drawing Sheets

U.S. PATENT DOCUMENTS

| | | | |
|---|---|---|---|
| 2006/0161647 A1* | 7/2006 | Wojtkiewicz et al. | 709/224 |
| 2006/0190605 A1* | 8/2006 | Franz et al. | 709/226 |
| 2007/0064604 A1* | 3/2007 | Chen et al. | 370/230 |
| 2007/0147344 A1* | 6/2007 | Sundqvist et al. | 370/352 |
| 2007/0168712 A1* | 7/2007 | Racunas et al. | 714/12 |
| 2007/0239820 A1* | 10/2007 | Zhong et al. | 709/201 |
| 2008/0084900 A1* | 4/2008 | Dunn | 370/516 |
| 2008/0232269 A1* | 9/2008 | Tatman et al. | 370/252 |
| 2009/0141742 A1* | 6/2009 | Huh et al. | 370/498 |

FOREIGN PATENT DOCUMENTS

WO    WO 2005088929 A1 *   9/2005

\* cited by examiner

METHOD AND APPARATUS FOR DESIGNING, UPDATING AND OPERATING A NETWORK BASED ON QUALITY OF EXPERIENCE

CROSS-REFERENCE TO RELATED APPLICATIONS

This application claims priority to U.S. Provisional Patent Application Ser. No. 60/854,785 filed Oct. 27, 2006, the content of which is hereby incorporated herein by reference.

TECHNICAL FIELD

The present invention relates to network design and control, and in particular to a method and apparatus for designing, updating, and operating a network based on quality of experience.

BACKGROUND

Data communication networks may include various computers, servers, hubs, switches, nodes, routers, proxies, and other devices coupled to and configured to pass data to one another. These devices will be referred to herein as "network elements." Data is communicated through the data communication network by passing protocol data units, such as frames, packets, cells or segments, between the network elements by utilizing one or more communication links. A particular protocol data unit may be handled by multiple network elements and cross multiple communication links as it travels between its source and its destination over the network.

There are many types of media, such as voice, audio, video, and data, that may be transmitted on a communication network. Initially the different types of media were carried on different networks. More recently, these various types of media have started to converge so that they may be carried on a common network. To accommodate this, many network providers have added capacity to the core of the network to ensure that there is sufficient bandwidth in the core to carry all the traffic. At the same time, it is common to oversubscribe the access networks to reduce costs and increase revenues generated by the access networks. Unfortunately, these practices are contradictory to maximizing service quality and minimizing network cost.

SUMMARY OF THE INVENTION

A software program or a set of software tools allows end user quality of experience to be quantified and translated into network conditions required to achieve that end user quality of experience. By focusing on the Quality of Experience (QoE) for the applications that will use the network rather than the traditional bottom up approach, and then looking to design the network based on those end user requirements, the network may be designed and/or operated to achieve a high quality of experience. The program and tools may be used at different phases of the networking cycle, including design, planning, deployment, and operational phases, to allow the QoE requirements to be obtained while optimizing network cost and utilization. A QoE server may be implemented off line and used for network design/planning, or may be included on the network to monitor the network and control operation of the network to achieve the intended QoE.

BRIEF DESCRIPTION OF THE DRAWINGS

Aspects of the present invention are pointed out with particularity in the appended claims. The present invention is illustrated by way of example in the following drawings in which like references indicate similar elements. The following drawings disclose various embodiments of the present invention for purposes of illustration only and are not intended to limit the scope of the invention. For purposes of clarity, not every component may be labeled in every figure. In the figures:

DETAILED DESCRIPTION

A communication network may be designed and operated by focusing on the end user or application Quality of Experience (QoE). The underlying Quality of Service (QoS) may be derived from the QoE requirements, which may be used to design or control operation of the network so that the desired QoE may be achieved. By focusing on the QoE at the outset, the network may be designed in such a manner that it is able to achieve required QoE in an efficient manner. In operation, the network may be monitored for QoE violations and controlled or adjusted to achieve the intended QoE. A QoE server containing software designed to implement the QoE process described herein may be implemented to automate portions of the process or the entire process.

Figure 1:
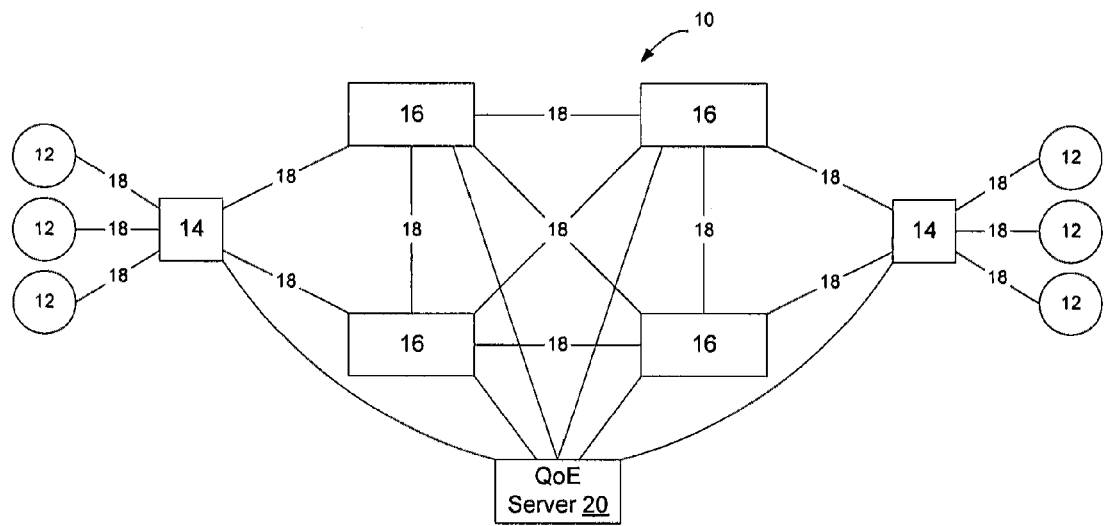
FIG. 1 is a functional block diagram of an example communication network.

FIG. 1 shows an example communication network 10. As shown in FIG. 1, end users/applications 12 connect to an access network device 14, such as router or switch. The access network device is generally part of an access network which may be implemented using many different types of technology. For example, common access networks allow a user to connect to the communication network over a wireless network, using dial-up network access system, via Digital Subscriber Line (DSL), cable modem, fiber optic modem, or in another manner. The particular manner in which the user 12 connects to the access network device 14 may affect the end user's quality of experience, and thus should be taken into account when designing the overall network 10.

The access network devices are generally connected in a metropolitan area network formed of many such access network devices in a common geographic area. The access network in turn is connected to a core network implemented using core network elements 16.

The core network enables high-bandwidth interconnection of metropolitan area networks so that users in different geographic areas may be interconnected.

The communication network may be used by many different users for different purposes. For example, users 12 may watch movies, listen to music, talk, participate in video teleconferences, and generally use many different types of media. Different applications have different needs, in terms of the overall latency that they are able to tolerate, the amount of jitter, echo, and other parameters that they are able to tolerate. According to an embodiment of the invention, the end user and application needs and expectations, as well as human factors, should be used to determine how the network is designed initially, upgraded over time, and/or operated to allow the end user/application quality of experience needs to be accommodated.

As shown in FIG. 1, according to an embodiment of the invention, a Quality of Experience (QoE) server 20 is provided to implement software that will allow the network to be designed, upgraded, and/or operated to enable the QoE needs to be accommodated. The QoE server may be a stand-alone server and operated independently to perform network design. The QoE server may also be operated on an existing network and used to enhance operation of the network. The QoE server may be implemented as a stand-alone computer device, or may be implemented in one or more of the network elements 14, 16, or in another control server operating on the network. Additionally, the QoE server may be connected/interfaced to one or more of the network elements so that it may be used to monitor QoE and network conditions while the network is operating. Alternatively, when the QoE server is used only in connection with designing a network or an upgrade to a network, the QoE server may be run in isolation without being connected or interfaced to the network 10. Thus, the invention is not limited to an embodiment that is connected to the network 10.

Figure 2:
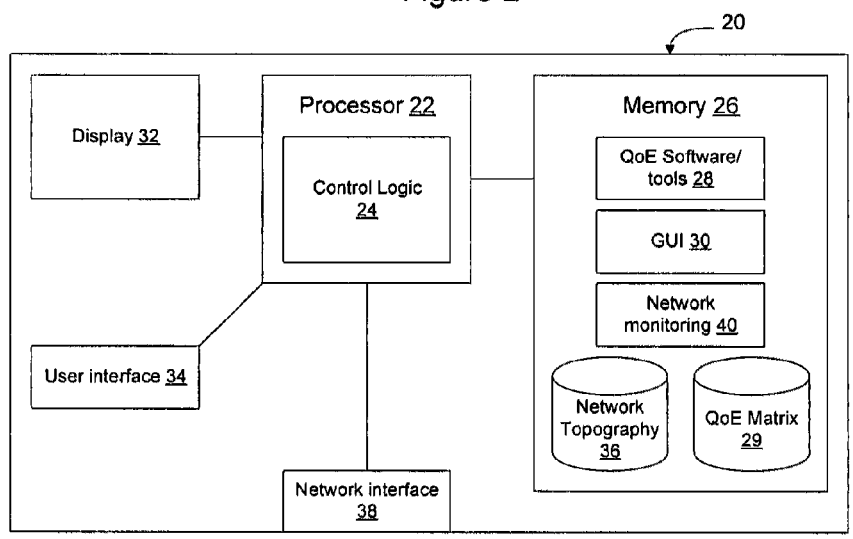
FIG. 2 is a functional block diagram of a computer that may be used to implement a Quality of Experience server according to an embodiment of the invention.

FIG. 2 shows a block diagram of a QoE server according to an embodiment of the invention. The QoE server may be implemented as a standard computer having a processor 22 that is capable of implementing control logic 24. Since computers are well known, and since the QoE server may be implemented on a common computer, the internal components of the computer have not been shown. As shown in FIG. 2, the QoE server has a memory 26 in which QoE software and/or QoE software tools 28 are stored. In operation, data and instructions will be loaded from the memory 26 into the processor 22 as control logic 24 to enable the QoE server to implement the functions of the QoE software 28. A QoE matrix database 29 may be provided to store data for use by the QoE software.

The memory 26 further includes software to implement a Graphical User Interface (GUI) 30 to enable a information to be shown to a user of the QoE software on a display 32. The user may interact with the GUI via an user interface 34 for example by manipulating a mouse, keyboard, light pen, or other input device.

The memory 26 may also include information on the network topography 36 to allow the QoE software to be implemented in a particular network context. For example, in the communication network of FIG. 1, the QoE server may contain a list of nodes, links, users, and their interconnection in the network topography 36. The network topography 36 may be manually input or derived from information received from the network 10 via a network interface 38. Where the QoE server is to be used to monitor the operating conditions of the network 10, the QoE server may include network monitoring software 40 that is designed to allow the network element to monitor network conditions or receive indications from the network that one or more QoE parameters is not being met by the network.

Figure 3:
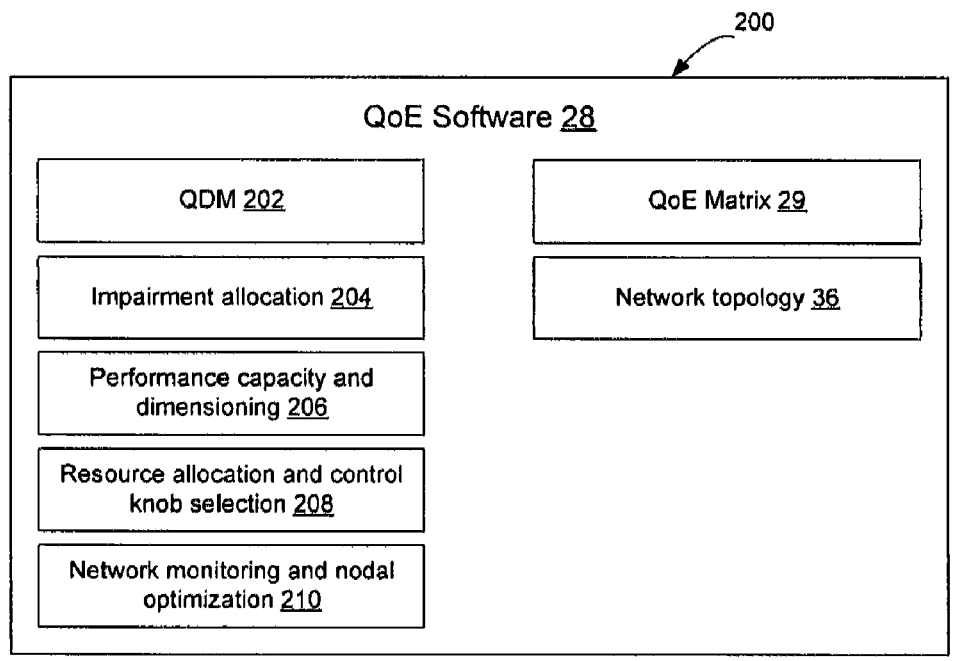
FIG. 3 is a block diagram of an example of Quality of Experience software according to an embodiment of the invention.

FIG. 3 illustrates one example of a suite of tools (QoE software 28) that may be used to implement QoE software/tools 28. As shown in FIG. 3, the QoE software 28 includes a QDM module 202 that may be used to determine application end-to-end requirements using user input and input from the QDM matrix 29. The QDM 202 receives as inputs a set of parameters defining the service, and outputs a set of QoS values for the service.

The QoS values and network topology 36 are used as input to an impairment allocation module 204 which allocates impairment budgets to the various network elements that will implement the service. A performance capacity and dimensioning module 206 uses the impairment allocations and information about the traffic that will be carried on the network to determine the capacity of the network. Resources are then allocated and control knobs selected using a resource allocation and control knob selection module 208. In operation, a network monitoring and nodal optimization module is used to monitor the network and, when the network is not delivering required QoE for the service, to optimize the configuration of the network and/or a particular node on the network. The operation of each of the modules shown in FIG. 3 is described in greater detail below.

Figure 4:
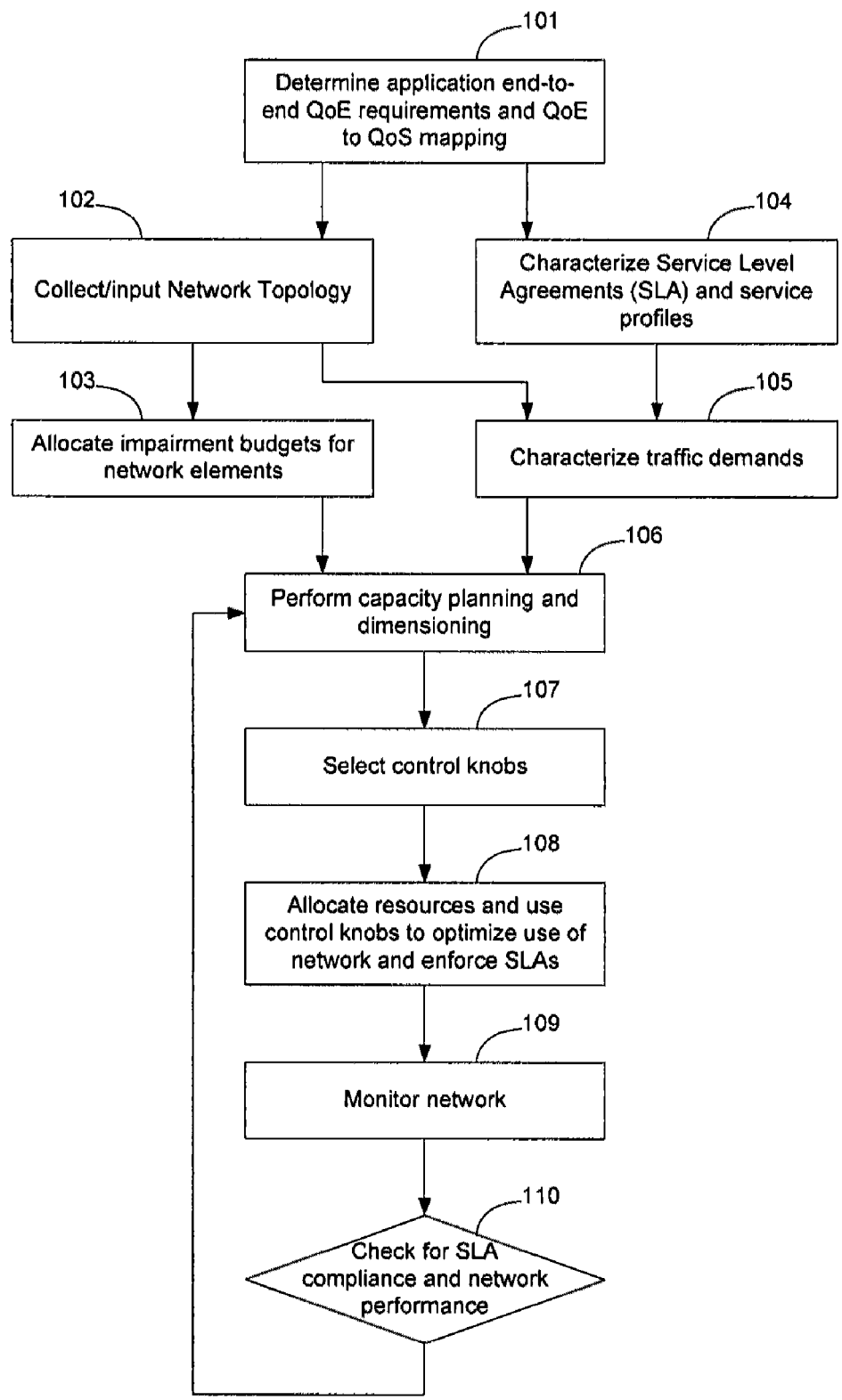
FIG. 4 is a flow diagram of a method of designing, updating, and operating a network based on quality of user experience according to an embodiment of the invention.

FIG. 4 illustrates a method of designing, updating, and operating a network based on quality of user experience according to an embodiment of the invention. As shown in FIG. 4, the first step in the process is to determine the end-to-end Quality of Experience (QoE) requirements for the various applications that will be using the network. Once the QoE requirements are known, they may be mapped to QoS requirements that may be designed into the network.

There are many different factors that may influence the user's quality of experience when interacting with a network. Several of the factors are user interface related, such as the usability of the physical controls that the user may use to access a service or a feature on the network, the process feedback provided to the user such as dial tones busy tones, etc., and the mental effort that is required of the user to use a particular feature or feature set of a service.

In addition to user interface related factors, there are also system related factors that may influence the quality of experience provided to a user. For example, the delay or network response time may be important to the user. Similarly, the fidelity of the sound or image presented to the user may be important from a quality of experience standpoint. The availability of a service on the network and the security associated with the service may likewise impact the quality of experience. Thus, quality of experience is not simply a determination of bandwidth, it also includes the ability of the network to deliver what the user needs. Ultimately, the QoE refers to the user's perception of performance based on the user's expectations.

Figure 5:
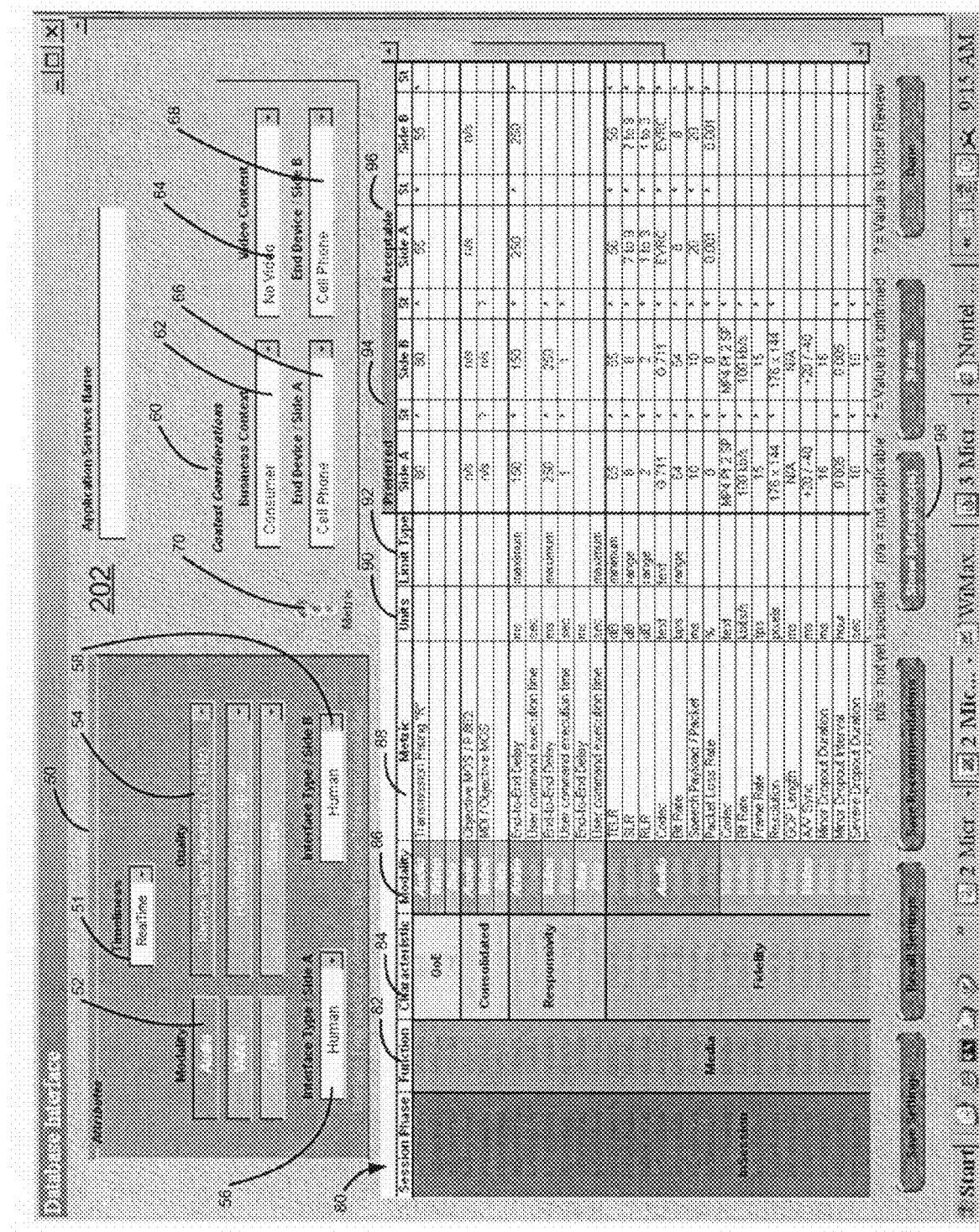
FIG. 5 is a screen shot of a tool that may be used to implement the first step of the process shown in FIG. 4.

FIG. 5 illustrates a tool that may be used to determine QoE targets for an arbitrary service/application within various contexts/scenarios, and as a function of service properties like timeliness, fidelity, contact type, and other quantifiable factors. This tool may be implemented as part of the QoE software/tools 28. The tool shown in FIG. 4 will be referred to herein as the QoE Decision Matrix (QDM) tool. The QDM tool allows a user of the QoE software such as a service provider, network engineer, or other user to determine the quality of experience requirements for an application or service. The application/service may be an existing service on the network, may be a new or emerging service on the network, or may be only conceptual. The QDM tool allows the end user QoE to be objectively quantified and may be used to identify critical QoE performance parameters related to both the application and transport plane. This sets the targets for the network for a particular service, which are output as QoS parameters for the network.

The tool calculates end-to-end application layer requirements for existing and emerging applications. Based on user input, the tool generates a comprehensive set of metrics and targets covering the media/control path for multiple modalities. The rapid calculations permit "what if" scenarios, including different service composition (voice, video, text, file sharing, etc), different context of use (wireline, wireless) and overall end-user preferred and acceptable targets. Based on the selected modalities, attributes, and if desired the usage context, the QDM tool generates a set of requirements that the service must meet. In the embodiment shown in FIG. 4, the QDM tool decides which recommendations are appropriate for the service and recalls those recommendations from the QDM database (QoE matrix 29). The QDM tool also provides references for where the recommendations come from, such as references to industry standards, research studies, industry experience, current practices, etc. The output from the QDM tool is a set of QoS parameters that may be used for detailed network planning and analysis.

The QDM tool thus allows an application or service to be broken down into its constituent modalities, which are entered into the QDM tool. The QDM tool uses the entered modalities and looks for QoE specifications from a QoE matrix 29. Based on the modalities and the QoE information selected from the QoE matrix, the QDM tool generates a set of performance recommendations that should be met by the network and the application to allow the network to provide the necessary QoE for that application/service.

Figure 9:
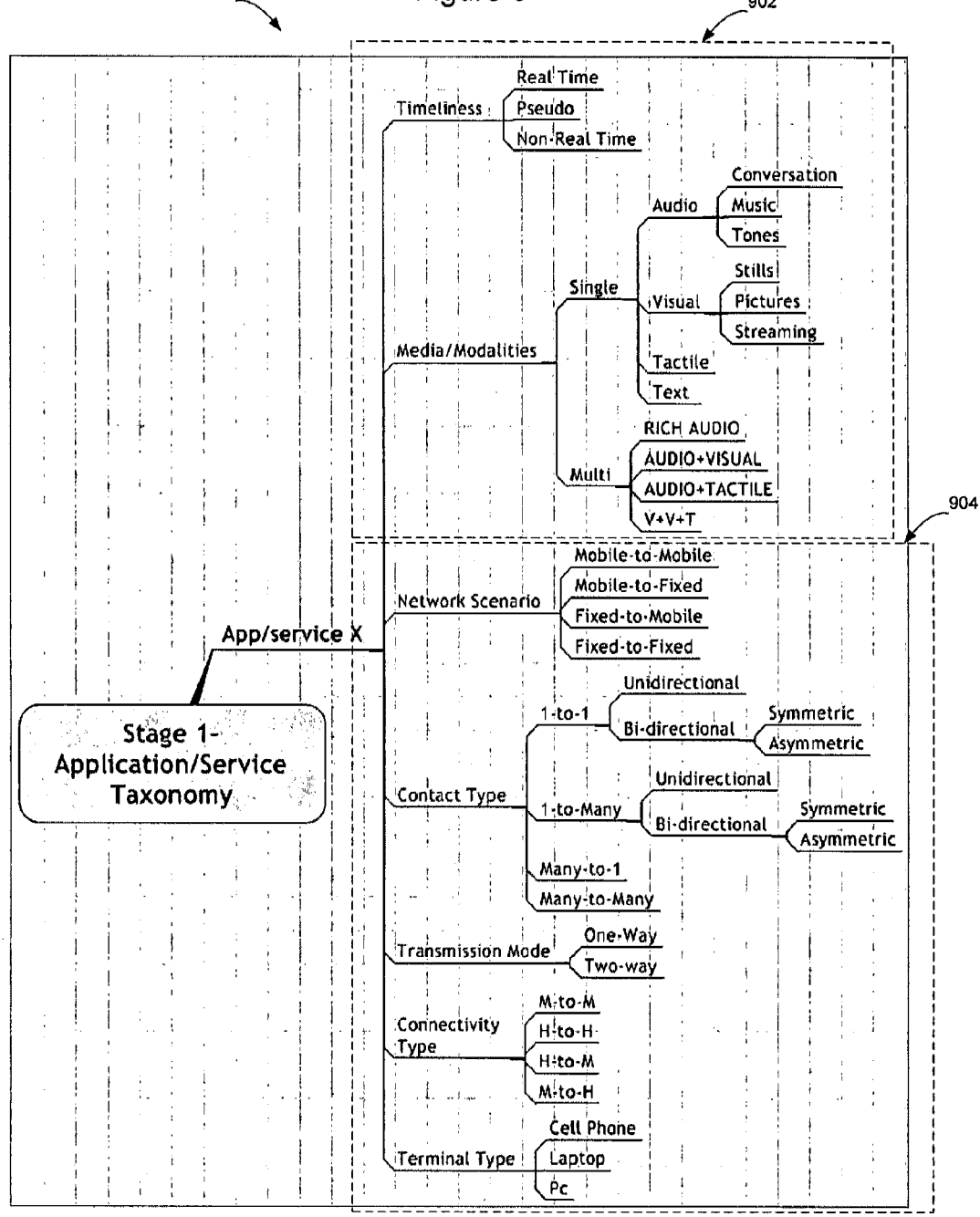
FIG. 9 shows an example QDM tool according to an embodiment of the invention.

FIG. 9 shows an example of one structure 900 of the QDM tool that may be used to input information about a service to be offered on a network. In the embodiment shown in FIG. 9, the QDM structure allows users to specify context independent parameters 902 about a service and context dependent parameters 904 about the service. The context independent parameters are used to derive the preferred targets for the service, while the acceptable targets are determined from the context dependent parameters.

Each parameter has the following single or combined features: a quantifiable counterpart, a singular weighting scheme, and empirical data supporting metrics that have been defined to support the QoS parameters. To derive a single end to end QDM output, the overall weighting scheme is used with a basic function. Specifically, the required quality of experience will be determined as a function of the primary contributors (context independent values) and the modifying weighting contributors (context dependent values).

In operation, a user that would like to define a service will specify the service to the QDM tool by selecting parameters that describe the service. Based on these inputs, the QDM tool will access the QDM database to determine the QoS parameters that should be provided by the network to allow the QoE requirements for the service to be provided.

As an example, assume that it is desirable to use the QDM tool to determine the QoE for an interactive voice conversation service. The timeliness parameter for this service may be selected to be "real time" and the media/modalities may be selected to be "single" since a single media (voice) is being implemented in the service. The combination of these two parameters are used to key into the QDM database to return a preferred QoE parameter for the service. Assume in this instance that the QoE parameter is 150 ms, in that the total latency for the service is 150 ms.

The particular context in which the service is being offered may then be considered, as end users may be willing to put up with additional latency in particular contexts. In this example, it will be assumed that the network scenario being considered is "mobile to mobile", that the contact type is 1 to 1, bidirectional, and asymmetric. It will further be assumed that the transmission mode is "two-way" so that both parties can talk to each other, and that the connectivity being handled is "human to human". Finally, it will be assumed that the terminal in use is a cell phone or PDA. These context dependent parameters will be input to the QDM tool and used to key into the QDM database. The QDM database has numerics assigned, including weights that are based on actual empirical data and/or extrapolations from empirical data. The QDM tool will extract the numerics for each of these context dependent parameters to determine how the preferred QoE parameter should be adjusted. For example, several of the context dependent parameters may increase the QoE parameter (have a positive value) and several of the context dependent parameters may decrease the QoE parameter (have a negative value).

The overall QoE is a function of the context independent and context dependent parameters. For example, assume that the QDM database included a +25% value for a mobile-to-mobile network scenario, and a +25% for a cell phone/PDA terminal type. In this instance the context dependent parameters would cause the original QoE value to be increased by 50% which, in this example, causes the QoE value to be increased to 225 ms. This provides a target Quality of Service for the service that was defined using the QDM tool.

FIG. 5 shows a screen shot from an example QDM tool 202 according to an embodiment of the invention. As shown in FIG. 5, the QDM tool has a GUI with an attribute input area 50 via which an user may select context independent attributes for the service or application under consideration. For example, the user may select timeliness of the service 51, the modality of the service 52 (such as audio, video, or data), and specify the quality of the modality. In the illustrated embodiment, a drop down menu 54 is provided to allow the user to select one of a plurality of different quality options based on the modality selected. The user may also be allowed to specify within area 50 the type of interface 56, 58 that will be on either side of the service. In the example shown in FIG. 4 the user has selected "Human" as the interface type for side A and "Human" as the interface type for side B. Other interface types may be selected via the drop down menu in the input dialogs to select other interface types depending on how the service/application will be used.

The QDM tool may also includes a context dependent input area 60 via which the user is allowed to specify the context in which the service will be offered. For example, the QDM tool shown in FIG. 5 has a first field 62 containing a drop down menu via which the particular business context may be specified (i.e. fixed, mobile, business service or consumer service). The QDM tool also has a second field 64 via which the QDM tool user may specify whether the service involves video. The context input area 60 may also include fields 66, 68 that may be used to specify the type of end device likely to be used at the interface on side A and side B. In the illustrated example the end device has been specified as a "cell phone". Other types of devices may be specified as well by accessing the drop-down menu in the input fields 66, 68. Where the user has questions about how to use a particular metric, the user may access help via the help button 70.

Based on the attributes input via the attribute input area 50 and the context input via the context input area 60, the QDM tool will generate a comprehensive set of metrics and targets covering the media and control path for each selected modality, based on values stored in the QDM matrix 29. The metrics are displayed in a display area 80. As shown in FIG. 5, the display area may display preferred and acceptable values for a number of different qualities that should be achieved for the service specified in the attributes/context inputs.

As shown in FIG. 5, the display area 80 includes a column 82 to indicate if a particular metric is related to the media path or control path. The display also has a characteristic column 84 to describe the characteristic being described by a particular metric. The display also includes a modality column 86 to describe the modality associated with the particular metric and the metric itself 88. The display also contains a column 90 indicating the units associated with the metric and a column 92 containing the type of limit such whether the metric is an upper or lower limit, or a range of values. For each applicable metric, a preferred 94 and, if available, acceptable 96 value will be specified. By highlighting a particular metric and then clicking on a "show references" button 98, the underlying standard or other background reference material may be provided to tell the user where the metric values come from.

In operation, the user will specify the attributes and context of a particular application/service using the QDM tool 202, and the tool will use these values and the QDM matrix 29 to generate the metrics for the service. These QoS values may be saved for later use or exported to other QoE tools in the QoE software suite 28 (see FIG. 3).

Referring back to FIG. 4, to allow the application/service to be implemented in a particular context, the network topology is input or collected (102) and an impairment allocation tool 206 is used to determine the QoS budget for each of the components that will be involved with the service (103). For example, assume that the maximum end-to-end delay for a particular service is 150 ms. The impairment allocation tool will determine the topology over which the service will be offered and allocate a portion of the delay to each of the network elements along a path through the network. This will specify each network element's "impairment budget" for the service. Additional details regarding Impairment Budget Allocation are described in greater detail below in the section entitled "Impairment Budget Allocation."

In addition to the physical impairment aspects, the process should also take into account the commercial aspects of the service, which may be implemented as service level agreements (SLAs) with customers (104). A SLA is used to specify parameters associated with the service that are to be provided by the network. Since the network service provider will be contractually obligated to its customers according to the SLAs that it has in place, the process of designing a network or upgrading the network should take these factors into account as well. For example, assume that the QoE requirement for a particular service was determined to require an upload bandwidth of 0.1 MB/s, but the service provider had contracted to provide the user with 0.5 MB/s upload bandwidth. In this instance the SLA requirements would exceed the QoS requirements determined by the QDM tool. The SLA requirements should thus also be used when designing the network/upgrade so that the requirement of the SLA may be implemented on the network. The characteristics of the SLA are then used in connection with the network topology to characterize traffic demands on the network (105).

As shown in FIG. 3, the QoS metrics, impairment budgets, network topology, and characterized network demands are used to perform capacity planning and dimensioning (106).

For example, a performance capacity and dimensioning tool 206 may be used to perform this step. Additional information relating to performance capacity and dimensioning is set forth below in the section entitled "Network Capacity Planning and Dimensioning."

Depending on the type of service being implemented, and the underlying resources being used, it may be possible to adjust various aspects of the network to improve QoE. These aspects are referred to herein as control knobs. Since not all control knobs may be available, or may not impact a particular metric, those control knobs that are likely to have an effect on the metrics associated with the service are then selected (107). Additional information regarding selection of control knobs is provided below in the section entitled "Resource Allocation and Control Knob Selection."

If the service is implemented, resources will be allocated for the service and the selected control knobs may be used to optimize use of the network for the service (108).

Impairment Budget Allocation

Impairment budget allocation takes as input a specific path for a given service type, based on the end-to-end network topology, and budgets QoS requirements like Delay, Jitter and Packet Loss Ratio (PLR) derived by the QDM tool among network segment and key access network element along the network topology. This enables the upper bound thresholds of the QoS metric budgets to be derived at each intermediate node and network segment. The need for this step is because of the bandwidth constraints in the access segment of the network, particularly in the context of wireless wherein such budgets would enable one to engineer networks to the requirements of the applications hence utilizing the resource more judiciously. Also this knowledge is later used in the step of capacity planning and monitoring services to minimize QoS violations.

In theory the problem of end-to-end impairments budgeting for each node for a general mesh topology is a difficult problem. It becomes significantly less complex in the case of access networks where the topology is less complex (mostly a tree type) which enables path based analysis.

The QoS targets used in this step are obtained from the QDM tool. Latency can be budgeted by deriving upper bounds for latency values, from which bounds for jitter buffer can also be derived. The basic approach of determining these bounds (budgets) is to break down the end-to-end latency requirements among network segments and critical network devices as a function of the fixed latency packet processing functions and overhead introduced by these entities.

The budgeting process can be viewed as a worst case budgeting process that begins by first breaking down the end-to-end latency target into fixed and variable components. Fixed budget component of the end-to-end delay account for the factors that are load independent functions like packet data serialization, packet encoding/decoding, compression/decompression and security functions. While variable budgets takes into account factors that are load dependent, and this includes budgets primarily induced because of queuing/scheduling functions. The variable budget also provides the tolerable maximum jitter at each node.

Delay: Delay is basically computed as the sum of all the component delays induced by the network as the packet is transported from its source to its destination. The contributing factors for delay can be understood by breaking it into fixed and variable components.

De-jitter Buffer: This has been determined using the variable delay margins available at the network segments and network elements in an end-to-end context. In some cases where the one way delay budget may be higher than what may be required may be because of high margins for the variable delay component. In this case the Delay-Jitter buffer can be sized as a percentage of the computed delay-jitter buffer size.

Jitter: Jitter is a measure of variability of the end-to-end packet latency. Jitter is caused because of variability of load on the intermediate nodes and links taken by a flow. The definition of Jitter that is calculated using the budgeting process is the maximum jitter for the last mile using the variable component of the delay budgets. End-to-end jitter may also be budgeted.

Packet Loss Ratio: Packet loss ratio budgeting assigns the allowable end-to-end PLR budget in the last mile. Considering the lossy nature of the core, PLR budgeting may also be done on an end-to-end basis.

Latency Budgeting Algorithm

The budgeting process is performed for each application type separately considering its end-to-end scenario from a media path perspective. Budgets are derived assuming a single packet flow from the source to the destination in both upstream and downstream direction.

An assumption is also made on the available throughput on the intermediate link, so that an understanding of the available throughput is required. Since the budgeting is useful to delay-sensitive real-time applications, and assuming that they are given priority in the transport plane, we make the assumption that full interface bandwidth availability at intermediate network routers. In the last mile, an approximation of the average available bandwidth is considered.

Another important variable that needs to be considered is the packet size of a service flow. We consider the worst case packet size for each network segment with its overhead required to transport the packet.

When budgeting for L2 or L3 network segments, we treat them as an abstracted cloud. The property we use to categorize the property of the cloud is its maximum distance a packet would have to travel across the network, for our analysis we consider network segments as regional (2,000 km), national (5,000 km) and international (10,000 km). Considering that these networks are typically over-provisioned we assume that the only latency contribution is due to its propagation and switching delay.

Latency Budgeting Process

Figure 8:
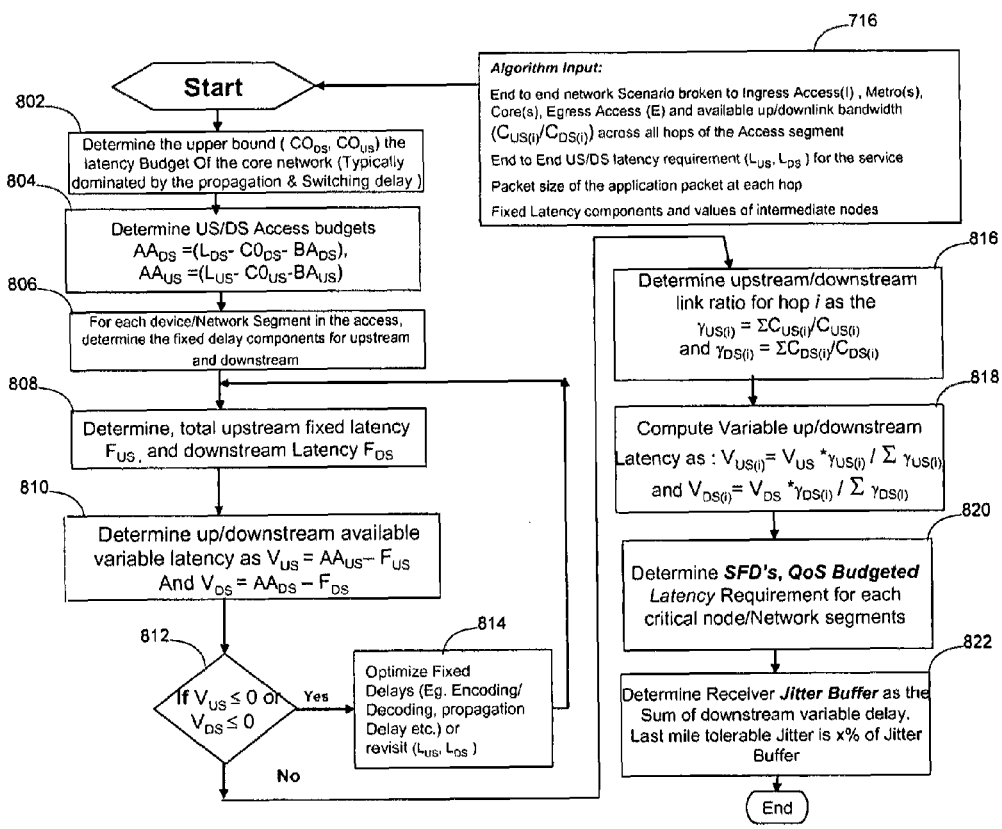
FIG. 8 is a flow diagram of a method of allocating impairment budgets to network elements according to an embodiment of the invention.

The budgeting process can be used to budget the latency requirements and derive Service Flow Descriptors for different applications/services being considered for implementation on the network. As shown in FIG. 8, the algorithm receives several inputs. Specifically, the process receives end-to-end network topology, broken into ingress access, metro, core, egress access, and available up/down bandwidth. The process also uses the upstream latency ($L_{US}$) and downstream latency ($L_{DS}$) for the network scenario, the maximum packet size with the payload size and the transport overhead, the fixed delay contributed by each intermediate network element and network segments, and the available bandwidth ($C_{US(i)}$, $C_{DS(i)}$) for a packet.

FIG. 8 shows the steps involved in budgeting latency across elements in an access network of interest. The algorithm can also be generalized to do the budgeting for any end-to-end case. The end-to-end network context can be broken down into three segments: the source access segment (A-Access), the core (C) and destination access segment (B-Access), with latency being budgeted in each segment.

Initially, the upper bound latency guaranteed by Core and B-Access segment will be estimated (802), so that an overall latency budget for the A-Access may be determined. To arrive at the engineered latency bounds ($AB_{US}$, $AB_{DS}$) afforded by B-Access networks, well known engineering guidelines that are available in the literature and known by experts in the specific access technology may be used. For the core network, the major delay contributions are due to propagation and the switching delay. To quantify this we use two variables: the maximum distance a packet has to travel once introduced in the core, and the maximum number of intermediate routers the packet will encounter as it passes though the network. A delay of 3 μsec/km is used to compute the core network propagation delay due to distance. To compute the switching delay, we assume a maximum number of hops of 20 and assign a delay associated with each hop. We sum the two delays to arrive at core upstream and downstream latencies represented as $CO_{US}$ and $CO_{DS}$.

Having computed the Core and B-Access segment delays, the latency budget ($AA_{US}$, $AA_{DS}$) available for the A-Access segment can be derived (804). The rest of the steps use this latency budget to derive the latency/Jitter requirements of each of the intermediate critical nodes and segments in the A-Access network.

Next, the process will focus on the access network segment and characterize the fixed (i.e. the non-load dependent) latency contributions due to packet processing and control overhead introduced by the terminal, intermediate network elements, and the metro network segments (806). This can be understood by going through the OSI stack and understanding the functions that may be applicable to the packets of the application in question. Typical functions that contribute significantly to fixed latency are: table look up, like in case of IP Routing, Network Address Translation (NAT) traversal or Firewall functions; Data Security processing due to algorithms related to authentication or authorization; Serialization delay because of bandwidth constraints; Retransmission procedures to check bit errors like Forward Error Correction (FEC) algorithms or delay introduced by protocols like Automatic Repeat request (ARQ); Physical (PHY) layer control functions like coding and modulation in last mile.

One way to arrive at fixed delay introduced by these functions is to study the complexity of the algorithms and arrive at time complexity of executing the algorithm. At times, such an offline approach may not always give accurate estimates because of the dependency on hardware and software implementations of the system. So a more reliable source is to use the knowledge of the system developers to get an estimate on the latency introduced by a algorithm or packet function. By summing the fixed latency of each component, the upper bound of the latency may be determined (808).

In addition to fixed latency, the upstream/downstream variable latency is also calculated (810). In this context, the available variable delay budget in the upstream/downstream directions is calculated as the difference between of the total upstream/downstream end-to-end target and the sum of the fixed delay components. We refer to this variable delay component as $V_{US}$ and $V_{DS}$ of the delay.

Next a check is performed to determine if the variable component of the delay is negative (812). This check is used to determine whether the sum of the fixed components exceeds the total latency budget input at the beginning of the algorithm. If it does, then either the total end-to-end latency has to be revisited, or the fixed delay component functions may need further optimization until a positive margin is obtained, to account for variable queuing delay as the packet traverses the network.

Once the overall latency is acceptable, the latency is allocated to the links in the network that will handle the service, such that higher portions of the latency budget get allocated to links with slower link speeds, and lower portions of the budget get allocated to links with higher speeds (816). A weighted average may be used or another type of allocation process may be utilized. Hence the allocation is greater as we move into the access network. The upstream/downstream ratios $\gamma_{US(i)}$ and $\gamma_{DS(i)}$ are calculated for each segment of the network.

The computed upstream/downstream ratios, $\gamma_{US(i)}$ and $\gamma_{DS(i)}$ are then used along with the available end to end variable budget to determine the allowed variable latency for the access node and network segment (818).

These values are then used to derive the Service Flow Descriptors and upper bounds for the latency requirement because of processing delays related to prioritization, queuing, scheduling in a node (820). This procedure also aids in deriving the upper bounds on latency requirements contributed by the network segments. From an application perspective that applies a jitter buffer to smooth the play out of the received application stream, the downstream variable jitter buffer helps to understand the upper bound on the Jitter buffer (822).

An example may help understand application of the process in a concrete scenario. Thus, an example will be provided to show how the budgeting process may be applied to Voice, Video and Data service for a WiMax access network. Here we try to obtain QoS budget requirement in terms of Delay, Jitter, and Packet Loss Ratio for the terminal device, Base Station, Aggregation Router, and ASN gateway. Detailed working of this algorithms can be implemented using a software program such as Excel.

In the following example, the budgeting output provides the Service Flow Descriptors for a voice service, which is used by the Service Flow Management (SFM) module in the 802.16 Base Station (BS) to admit new requests from Subscriber Stations (SS). The proposed SFD's are based on the definitions of the service flow parameters in 802.16d document. In this example, the following assumptions made during the budgeting process:

- With respect to the PHY layer, a maximum of 5 ms MAP frame delay is assumed in the PHY layer, this delay accounts for time taken for all the PHY layer functions like Randomization, Coding, Interleaving and Modulation required to transmit a MAC PDU between the SS and BS.
- The budgeting doesn't assume the delays due to re-transmission mechanisms like ARQ/H-ARQ. However, if the mean delays because of the re-transmission are known, it can be easily incorporated into the budgeting framework.
- The WiMAX set up does not assumes any IMS components, hence control and media path implications because of it has not been evaluated.
- ASN-GW has been assumed to contribute to fixed switching and processing delay. Similar fixed delay is assumed to be contributed by CSN-GW which has been considered only in the case of budgeting for mobile WiMAX case.
- A propagation delay of 5 μs/km has been set to compute propagation delay across network segments. The processing and switching delay at each router is assumed to be 0.1 ms.
- In case of a fixed wireline access as in Cable MSO, G-PON, DSL, or PSTN we assume the networks are engineered to meet a one way delay of 40 ms for voice service. In case of traditional wireless networks like GSM/CDMA one-way latency is assumed to be bounded to 115 ms.
- The budgeting also assumes symmetrical budgeting targets for both upstream and downstream of the WiMAX access network. This is considering the worst case scenario where the WSP may not be aware of the type of destination network access where the session may be terminating in. But this constraint may also be relaxed by considering asymmetrical downstream and upstream budgets in the budgeting process.

One of the criterion for the proposed budgets to be accurate is the correctness of the assumptions made with respect to the fixed delay components. Good estimates of fixed delay contributing functions in various OSI layer can be obtained either by understanding the complexity of the algorithm, or seeking inputs from the feature implementers who could obtain it through actual runs. So if any of the proposed budgets discussed later deviates from what is observed in practice, it may be because of incorrect assumptions made with respect to fixed delays or may be due to not accounting for certain packet functions in the budgeting analysis which could easily be incorporated.

Voice Service Budgeting

The end-to-end latency targets used for budgeting are obtained from the QDM tool. In the following example, a one way latency target of 150-250 ms has been assumed.

For the budgeting purpose we assume a G.711 encoder with 20 ms packetization delay without any silent-suppression. The voice service (call) may thus be viewed as having a WiMAX access, traversing a core network and terminating in a cellular (GSM) network. The MAN network segment in the access domain and the core network are assumed to have a maximum diameter of 5000 km.

With respect to bandwidth availability for single voice flow, we assume a symmetrical fixed bit rate available between the Subscriber Station (SS) and the Base Station (BS). With WiMAX this normally is achieved by mapping VoIP service to the UGS class of service. In this case since the scheduler tries to meet the Minimum Reserved Rate required by the service flow by unicast periodic grants equivalent to the rate at which voice packets are generated, and grant size equal to size of VoIP packet with the IP/RTP overhead, an assumption of fixed bandwidth can be justified.

An important assumption being made is that the bit rate available for a single VoIP flow. We assume that the BS is able to grant a bandwidth of 80 Kbps (equivalent to G.711 encoder rate) in the upstream and downstream directions. This assumption is reasonable for a fixed WiMAX context. The budgeting process also assumes that the CPE device at the users' end is also involved in OSI Layer 3 and above gateway functionalities like NAT traversal and firewall function, which contributes to a fixed delay component.

The maximum propagation and switching delay across the core (i.e. both upstream and downstream) is set to 20 ms. This value is set by considering a maximum network width of 5000 km with a propagation delay of 5 μs/km and other switching, processing and serialization delays. Of the remaining 230 ms of budget, traditional cellular networks like GSM or CDMA which are typically designed to bound the voice packet latency to 100-115 ms in the access portion of the network. Hence considering a worst case delay of 115 ms in the GSM access (B-access network), we have 115 ms of available budget that may be allocated to the WiMAX access network. This target budget is the one way delay for a voice packet in both upstream and downstream directions. Table 1 shows the initial break down of the one way delay (units in ms) budget among WiMAX access (A-Access), the core network (C) and a GSM access (B-Access):

TABLE 1

| End to End Target | A | CORE | B |
|---|---|---|---|
| 250 | 115 | 20 | 115 |

The available budget for the A-access network (WiMAX network) may then be allocated between the end user device (telephone) the network access device (gateway), the WiMAX base station, the aggregation router, the Access Service Network (ASN), and the ASN-gateway. A detailed budget may then be created in terms of fixed and variable allocation across the WiMAX ASN. For each of the devices, fixed and variable delay will be allocated in both the upstream and downstream directions. The sum of the available upstream and downstream variable budgets may then be used to set the de-Jitter buffer size.

In the previous example, the latency budgeting process was used to show how the latency budget for a voice service may be allocated in a fixed WiMAX A-access network. The process may be used to allocate latency budget for other types of service, such as broadcast video and data (i.e. gaming) in a fixed WiMAX network. Similarly, the process may also be used to allocate the latency budget in a mobile WiMAX network. Thus, the invention is not limited to the one example, but rather the example was provided to present an explanation of utilization of the budgeting process in a particular context.

The budgeting process may be implemented as a software module, such as software module 204 of QoE software 28 shown in FIG. 3. The budgeting process implements a useful methodology to determine the upper bounds of QoS metrics for any end-to-end scenario and service type. More importantly the proposed framework allows one to derive engineering budget requirements at both network and node level. The framework is also useful to perform sensitivity analysis on the already engineered one way delay because of introduction of new technology or delay components affecting the end-to-end media path.

Network Capacity Planning and Dimensioning

Network capacity planning deals with design and dimensioning of networks nodes and links taking into account factors like user demands for a particular service, traffic generated by those demands and its QoS requirements, routing mechanisms applied in the network, and QoS control mechanisms available at nodal and network level to enforce the dimensioning rules. Here we address the nodal and link capacity requirements in a tree access network. This step basically computes capacity requirements using the aggregate traffic demand for each service type, and budgeted QoS requirement discussed above. The output from this phase is the nodal and link capacity requirements and generic rules that would need to be applied at each aggregation point of the network to satisfy the QoS requirements of different service types.

A network planner has to take into account several factors before adopting solutions to solve problems related to capacity planning and dimensioning:

QoS Controls: The dimensioning process should take into account nodal and network QoS mechanisms. From a nodal perspective understanding of queuing, scheduling, shaping and policing mechanisms is required. From a network perspective, the availability of Call Admission Control (CAC) mechanisms and its granularity of operation, as well as DiffServ capabilities should be taken into consideration.

Service Availability Consideration: Availability here refers to the networks ability of satisfy a subscribers request for a service at any given time. For call based service performing call admission control, this is highly influenced by the pre-determined Grade of Service (GoS) metrics like blocking probability for which a given service is dimensioned.

Reliability Consideration: Reliability from a network perspective has implications at all the fundamental network stratums i.e. service, control, transport, and management plane with implications at both the nodal and network levels. Nodal level reliability issues deals with providing redundancy to the internal nodal modules processing packet traffic, and providing the sufficient backup capacity to account for any potential faults. From a networks perspective the service reliability significantly depends on reserving sufficient capacity in the back up paths to re-route traffic in case of any link or nodal failures.

Routing principles: Understanding of routing mechanism plays an important rule in understanding the capacity requirements. The routing path in access networks is determined by the tree topology. It may be considered to be quiet deterministic because of the hub-spoke topology, and can be optimized on the number of times the streams are being replicated at each aggregation point. In the case of an access network the routing mechanisms involve either applying a multicast or broadcasting information to multiple users. The mode of routing applied particularly has significant impact for bandwidth intensive video applications.

The output of the capacity planning procedure is to estimate the capacity requirement of each service that is being provisioned. The capacity planning procedure starts with an assumed network topology, information on number of users subscribing to the three basic services (conversational voice, broadcast and on-demand video, and Internet connectivity) and also the QoS budget (Delay, Jitter, Packet Loss Ratio) at each of the aggregation points. Based on these inputs, the goal of the capacity planning procedure is to determine the capacity requirements of each of the service in both uplink and downlink directions considering the affect of aggregation of flows for each of the service types.

Once the capacity requirements of each service type are computed, the aggregate link capacity requirements in both the upstream and downstream directions are calculated on each of the aggregation points, taking into account the capacity requirement by all the services and the oversubscription factor.

Access networks have, in general, tree topology where the end devices are leaves, and the edge node to the core network is the root. The links, which terminate at the end devices, carry traffic from and to those devices. Links, which are on the next levels on the tree hierarchy, carry aggregate traffic, with the aggregation level increasing on links closer to the tree root.

The required capacity of a link is determined from the expected traffic offered to that link, the performance targets set for that traffic and the traffic management mechanisms that are available to modify the traffic at that point in the network. Since a link between two nodes has certain maximum capacity, there is a maximum number of subscribers that the link can support. Given that and the number of subscribers that the access network has to support, the number of links required at each level of the tree can be determined. Similarly, since each node can terminate links up to a certain total capacity, the number of nodes at each level of the tree hierarchy can be determined.

A primary element of planning the capacity of an access network is to determine the capacity required for the links at each level of traffic aggregation. This is equivalent to determining how many users can be supported by a link of a specified bandwidth.

Link Dimensioning

The input to such calculation is the expected traffic, performance targets and the traffic management capabilities available at the ingress to that link. The expected traffic is usually described by a characterization of the arrival of packets and their length with the values of the distribution parameters. There are two general categories of traffic: (1) traffic generated by network devices to support networking functions such as connectivity, routing, etc.; and (2) traffic generated by communication sessions between end devices. The first category of traffic is usually given a preferential treatment, due to its criticality, and consumes a very small portion of link and nodal capacity in the access. The second category, user traffic is the traffic which primarily determines the requirements on link capacity.

User traffic generates packets only during sessions, which are setup between the users. Packet arrival process is therefore characterized by the characterization of the process of new session arrivals, session length and the packet arrival process during sessions.

There are two general approaches to the use of traffic characterization in calculating the required link bandwidth. The first approach uses an appropriate queuing model with variable service time, derived from packet length divided by link bandwidth. The arrival distribution to that model is obtained as a result of session arrival characteristics and the packet arrival process during sessions which can be obtained from the service profile used during characterization of the SLA. The second approach converts packet arrival process and packet length to a bit arrival process and uses queuing models with constant bit rates, fluid flow models or equivalent bandwidth models.

The second factor in deciding link bandwidth is performance targets for that traffic, which are usually specified as maximum packet loss, delay and jitter. Those targets are derived from the QoS requirements and budgeted between the links and nodes as described above.

The last factor that impacts dimensioning of a link is the traffic management capabilities at the ingress to that link. It is assumed here that all packets are assigned classes of service and that the ingress has a class-based scheduler, with a combination of strict priority and weighted fair queuing. The strict priority is for the class(es) that has tight targets for delay and jitter. The weighted fair queuing guarantees the shares of link bandwidth allocated to the classes of service. It is assumed here that the scheduler can limit the use of bandwidth by the strict priority class(es) to a pre-determined amount. If not, such a restriction has to be enforced by other means, such as Call Admission Control (CAC) or policing. Otherwise the strict priority traffic can starve other classes.

The first step in link dimensioning is determining the amount of bandwidth for each scheduler class. A method of calculating the required amount of bandwidth for a particular class of service depends on the level of aggregation, i.e. the number of end users supported by the link. At the bottom of the hierarchy is the link that terminates at the users' premises. In general, such a link carries traffic generated by a small number of active sessions, e.g. 1-3 simultaneous voice calls, 1-2 TV channels, 1-3 video gaming sessions, etc. Packets from each session are classified with the appropriate service class. Each service class should be allocated bandwidth required by the maximum number of sessions that a user can generate in that class. For sessions with constant bit rate the bandwidth would be a sum of peak rates. For sessions with variable bit rate the effective bandwidth approach can be used.

For links which aggregate traffic from a number of users, the maximum number of sessions in each service class has to be determined. First, assuming the access network has a tree topology, the total number of users supported by the link can be determined. The theoretical maximum number of concurrent active sessions on that link is the number of users multiplied by the maximum number of sessions that a user can have active at the same time. However, the probability of this happening is so small, that it would be impractical to use the theoretical maximum. Instead, a number N should be used that a probability of exceeding it should be very small, say for example 10-4, i.e. P(#active sessions>N)=0.0001. If there is a Call Access Control (CAC) mechanism, the probability is the probability that a user attempting to setup a session would be denied. If there is no CAC, the probability is the probability that the number of sessions would exceed the bandwidth allocated to their class. That would not mean necessarily that the QoS of those sessions would be affected. If other classes did not use their bandwidth allocations and the scheduler is work conserving, the excess sessions could use the unused bandwidth.

Once the maximum number of active sessions is determined, the bandwidth required by those sessions can be determined by using the effective bandwidth approach. If the number of maximum active sessions is sufficiently large, approximations based on normal distribution or large deviation theory can yield satisfactory results.

Effective Bandwidth

Effective bandwidth $\alpha(\delta)$ is the minimum rate at which a traffic stream should be served so that the probability of exceeding a buffer content B is not exceeded, i.e. $P(X>B) \leq \exp(-\delta)$, where X is the buffer occupancy in packets, bytes, etc. For the most typical traffic characterization the effective bandwidth is as follows.

Constant Rate

For a traffic stream with a constant rate R the effective bandwidth is equal to R, independent of the condition on buffer utilization. The constant rate model applies to traffic generated by a single CBR voice or video codec.

Poisson Traffic

For Poissonian traffic with the average intensity R, the effective bandwidth is $\alpha(\delta)=R(e^\delta-1)/\delta$.

On-Off Markovian Source

An on-off Markovian source generates traffic at a rate R when it is in the on state, and does not generate traffic in the off state. Durations of the on and off states are negative exponential variables with the means b and a. The fraction of time when the source is active, or source utilization factor $\rho=b/(b+a)$. Fluid flow approximation of the effective bandwidth for an on-off Markovian source is equal to $$\alpha(\delta)=[mR-1+\sqrt{(mR-1)^2+4m\rho R}]/(2m) \text{ where } m=\delta b(1-\rho)$$

Effective bandwidth is additive, which means that an effective bandwidth of a number of sources with the same constraint on buffer overflow is equal to the sum of the individual equivalent bandwidths. However, if only a conservative approximation of the individual equivalent bandwidth is known, as is the case in fluid-flow model approximation, the amount of the excessive bandwidth allocation increases with the number of sources. For large number of independent sources the rate of traffic can be efficiently approximated by the normal distribution with the aggregate mean rate $R=\Sigma R_i$ is the sum of the individual mean rates and similarly the standard deviation is obtained from the sum of the individual variances $\sigma=\sqrt{\Sigma \sigma_i^2}$. An approximation of the equivalent bandwidth is then given as follows $$\alpha(\delta)=R+\sigma\sqrt{2B\delta-\ln(2\pi)}$$

Gaussian Traffic

For a traffic stream with rate being an i.i.d. Gaussian process with the average R and the variance $\sigma^2$, the equivalent bandwidth is equal to:

$$\alpha(\delta)=R+\sigma^2\delta/2$$

Presence of long memory can be captured by modeling the rate process as a fractional Gaussian noise. From this model the equivalent bandwidth can be calculated as follows:

$$\alpha(\delta) = R + \left(\frac{\sqrt{2\delta}}{(1-H)^{H-1}}\right)^{1/H} H(\sigma^2)^{1/(2H)} B^{-(1-H)/H},$$

where H is the Hurst parameter. Long term memory is when 0.2<H<1. When H=0.5 this formula reduces to the previous one for i.i.d. Gaussian process These fundamental principals may be used to understand the capacity requirement of the three basic service types, voice, video and data. The uplink and downlink referred here is from the users perspective, a directed link for which the traffic moves to the user is considered downlink and into the network upstream.

Conversational Voice Dimensioning

Conversational voice is a bi-directional application hence has symmetric bandwidth requirement. Two types of single source voice models exist, first is the constant bit rate (CBR) in which case the codecs generate fixed rate of packet stream, and the ON/OFF source model as a result of employing Voice Activation Detection (VAD) in the voice system. Dimensioning may be performed for each case as well as for other types of services, such as broadcast and on-demand video, and data traffic.

One step in the capacity planning process is the understanding and accounting of the network reliability issues. Reliability of a network can be visualized from two broad grounds, one that is perceived by the users and the other that can be defined on certain criteria by the service provider. From a users' perspective, this can be gauged by the number of complaints received from customers regarding a particular service, hence could be categorized as service reliability. Further information about service reliability can also be derived from the user call logs to understand the service usage statistics like number of times the user calls were successful, blocked, re-tried etc. From the service providers' perspective, reliability can be understood from the number of hardware, software failures that the network encountered during a period of time. The reliability of the network infrastructure also plays an important role in deciding the service reliability perceived by the user. Hence reliability is a measure of reliability of the service providers' network that reflects back into the service reliability perceived by the user. This idea of reliability as feedback control loop mechanism as been captured in FIG. 4.

Reliability from a network perspective has implications at all the fundamental network stratums i.e. service, control, transport, and management plane, with implications at both the nodal and network levels. Nodal level reliability issues deals with providing redundancy in the software and hardware module that acts as part of all the three planes. Software modules include control, service, and management plane software components. Transport plane components at a nodal level include the line and trunk card modules, and the associated hardware processing the bearer traffic. Right levels of nodal backup components needs to be in place to deal with hardware/software or total nodal failures.

Similar reliability issues also need to be taken care of at network level where it is necessary to address problems like (1) additional network resource for Protection and Restoration problem in order to switch traffic in times of network failure or congestion periods, and (2) spikes in the data traffic or user demands for a duration of time due to unexpected events. The nodal and network reliability issues that have implication on the resource requirement should be translated into parameters that can be input into the Capacity Planning and Dimensioning process described above so that the dimensioning rules take these requirements into account.

Resource Allocation and Control Knob Selection

Control knobs in general refer to tunable parameters in the service, control and transport plane to optimize the QoE of a given service. The objective of this process is to develop the in-network instrumentation required to deliver multimedia solutions by identifying performance control knobs and methods to optimize them to deliver an enhanced user experience. Here we limit the discussion to only control knobs that affect the bearer traffic. The objective of this phase is twofold: first to understand the relationship between a given services' impairments and the parameters occurring in the application and network layer that affect an applications' QoS; and second to identify the set of control knobs that can be used to mitigate and optimize the service quality. We propose to address these steps through the procedure below: We first, at a high level, define the QoE metrics relevant to the application of interest, and then determine the relevant impairments that can affect and degrade the overall application performance. In general, we can observe that QoE is principally driven by three metrics: (1) Responsivity (2) Media fidelity and (3) Availability, corresponding to both media and signaling path.

For a given service once we have identified the impairments that affect the Responsivity, Media fidelity and Availability QoE aspects of a given service, we identify the set of control knobs considering factors like QoS requirement and the type of network. The control knobs that are identified are initially set to meet the requirements of the dimensioning rules identified in the previous step to meet the QoS requirement, which is further optimized in the next phase. The control knobs may also be used to adjust the service if it is later determined to be performing inadequately. The performance control knob inventory should then be followed by some classification criteria to ease selection. Control knob selection may be performed by the resource allocation and control knob selection module 208 based on the parameters of the service to be implemented. Several control knobs that may be selected using this process are described in greater detail below. The invention is not limited to an embodiment that allows the manipulation of each of these control knobs, as these and other control knobs may be determined to be relevant to a particular service depending on the underlying network implementation and the service to be deployed/monitored on that network.

In order to effectively optimize and tune multimedia N/W performance, it is necessary to identify which "control knob" produces what effect. That is, mapping a given impairments to an adequate mitigation strategy. Thus, initially, an inventory of control knobs is obtained for each layer of the network. That is, for each of the application, session, and transport layers, a determination is made as to what factors are able to be controlled. Then, for each technology (i.e. wireline/wireless), a classification and effectiveness assessment is performed to determine how the control knob functions in connection with that type of technology. Similar determinations are obtained based on application type (audio, video, data), network segment, media/signaling path, and for nodal vs. resource control. This assessment is stored in a database and used to select control knobs that are likely to be able to affect the network based on the type of service being implemented on the network (107).

There are likely to be many control knobs that may be used to control provision of a particular service. To help understand what types of control knobs may be selected, several example control knobs will be described.

Payload size: Packetization delay (frame length) will depend on the payload size of the packet. The payload size may affect both the fixed delay associated with encoding and jitter. Depending on the QoS limit set for the service, the payload size may need to be limited to allow the encoding to occur within the allotted period of time. For example, packetization may be allotted 10 ms in the QoS allocation process. Depending on the speed of the packetization process, this may limit the payload size of the packets.

Interleaving depth: The interleaving depth is used to add robustness on a lossy medium such as wireless or DSL. The typical range for this parameter varies form a few millisecond up to 40 ms. It is possible to set different interleaving depths for different service requirements such as real-time, pseudo real-time etc.

Forward Error Correction: Forward error correction is used to increase the probability of recovering corrupted or missing packets. FEC trades off extra payload redundancy (overhead) to increase reliability.

De-jitter buffer wait time: The jitter buffer absorbs the resultant backlog, and the instantaneous and average fill level of the buffer that represents the profile of arrival times and their persistence. The jitter buffer is designed for an expected traffic profile. To do that requires deterministic conditions. Where the persistence of instantaneous arrival and the average arrival rate do not exceed available buffer space, then no packets will be lost in network routers and a receiving media gateway. To achieve that condition requires that the average arrival rate does not exceed a certain percentage (utilization/loading) of the outgoing link speed of each multiplexing stage in the connection. Based on the expected traffic profile, the buffer size can be selected to accommodate the expected longest persistence of instantaneous loading above its average level of fill. Jitter buffers can and should be sized independently of packet size.

Where network loading is not controlled or bounded; about it is difficult to determine the correct jitter buffer size. Without a firm expectation of the instantaneous and average traffic profile, i.e. knowledge of the total traffic admitted to the network and its load balance across the network, then the probability of unbounded persistence and uncontrolled average loading is increased, but also unbounded. No size of jitter buffer in any router or receiving media gateway can be considered big enough. One should always engineer a managed network for well behaved normal operation, with a sufficiency of controls and monitors, and a capacity suited to demand. In such circumstances, a jitter buffer of a few milliseconds will have no negligible impact on voice quality and fully absorb the vagaries of packet switching.

Fragmentation level: Fragmentation is a method that could alleviate long serialization delay on low speed link, especially on fractional T1. Again here we are trading off overhead and efficiency for delay. The budget allocation should define if this is required or not.

Polling interval: The polling interval is mostly used in shared medium such as WLAN, MSO/cable. The polling interval is a trade-off between efficiency and response time. Shorter polling intervals are desirable but have increased overhead. The budget allocation should be used to determine the maximum allowable interval to meet the intended QoE targets.

Link size and capacity: This is one of the most important knobs that would affect queuing and, hence, jitter. Proper link sizing and associated scheduling share must be determined based upon expected traffic demands to minimize contention. The link size also dictates the maximum percentage loading to be provisioned before queuing reaches the asymptotic region.

N/W Load Level rate limit threshold: Jitter is not significant above 10 Mb/s, providing the post-90% loading asymptote is not reached. Providing that the statistical multiplexer output link loading is less than 90%, congestion should be eliminated or controlled hence jitter will be bounded to a few milliseconds and will have little extra impact on service quality. Where statistical multiplexer output link loading is not controlled (I.e. no admission control or traffic, no traffic route engineering, no rate limiting) loading is unbounded (>90% è100++%) and therefore jitter is unbounded—the delay can rise asymptotically (max buffer) hence enter congestion period. Service quality becomes unpredictable/unstable, especially as packet loss ensues. The potentially deleterious effects of homogeneous jitter and packet loss are only adequately resolved by bounding the % load, using all/any of network admission control, aggregate call admission control, and traffic monitoring and placement.

Traffic prioritization (scheduler, queue size, weight): There are several types of ways of prioritizing traffic for transmission on a network: FIFO, strict priority, and weighted fair queuing. Each has its advantages and the manner in which the traffic is queued for transmission may affect the performance of the service.

A FIFO traffic prioritization scheme uses a first in first out (FIFO) buffer to hold traffic for transmission on the network. For a voice only traffic network, the requirements on scheduler complexity is minimal and a simple first-in first out (FIFO) scheduler should be adequate. For network that is handling both voice and data, a strict priority scheduler or a weighted fair queue scheduler is required to prevent voice packet queue built-up and control jitter to acceptable limits.

A strict priority scheduler ensures that high priority packets are sent first, and when all high priority packets have been sent, then lower priority are scheduled. This type of scheduler has the potential of producing queue starvation, that is, lower priority packets might never get any scheduler share. Additional protection or control might be required to set a hard limit of the maximum scheduler bandwidth share for high priority traffic to implement starvation avoidance. In addition to the lower priority class of service starvation problem, another potential problem is expected to occur as the level of high priority subscription exceeds the capacity of the scheduler, that is, during over subscription even high priority traffic will be either queued or dropped. It should be pointed out that a strict priority scheduler does not offer hard guarantees of bandwidth but instead prioritize traffic using available scheduler bandwidth resources. A strict priority scheduler is not sufficient to assure and guarantee service quality; additional QoS mechanisms (control knobs) such as admission control, and rate limit policies are required.

Weighted Fair Queuing (WFQ) is popular scheduler for supporting multiple service classes, especially data service classes as it can control how each class receives a fair share of the scheduler bandwidth resources. Each class gets weighted amount of service in each cycle. Weights can be determined based upon SLA or by the proportion of traffic in each class. WFQ scheme could provide satisfactory queuing delay performance as long as the operating conditions are well defined and bounded. This means that the high priority traffic has a well defined Constant Bit Rate (CBR) characteristic, and the real-time sensitive traffic (voice/video) in WFQ has a well defined CBR characteristic.

Similar to the strict priority queuing scheduler described above, weighted fair queuing does not prevent oversubscription of a given class which could lead to substantial queuing delay if not configured or engineered properly. Any single WFQ queues can fill up and overflow as traffic load increases. When this occurs, all flows in that queue suffer packet loss. For real-time media such as voice and video, this may become a serious problem, as everyone suffers quality degradation. WFQ alone is not capable of offering guaranteed service such as priority or premium voice, video or gaming real time services. Additional QoS mechanisms including admission control methods and/or sufficient over-provisioning are required to provide hard QoE guarantees. The use of WFQ scheduling for real time sensitive traffic is not as stable as priority Queuing, as the scheduler weight needs to be adjusted as a function of a number of parameters, including competing bursty traffic (video traffic) load and distribution, virtual circuit capacity, higher priority traffic load, and number of WFQ classes.

The use of a WFQ scheduler might also be problematic for variable bit rate video as the traffic rate is continuously changing and would require WFQ share tuning and/or peak rate provisioning.

Traffic Conditioning—Policing/Shaping The primary objective of traffic conditioning is to perform a rate limiting function to ensure that the traffic going through a given node or service class does not exceed pre-determined limits. Two distinct types of rate limiting functions are typically used in packet networks: policing and shaping. Policing provides a soft rate limit with burst capabilities. It is used to limit bursts of traffic to the policed rate, but does not perform traffic smoothing or shaping. Policing also does not add delay to the traffic as it does not require the traffic to be buffered. Shaping, by contrast, provides a hard rate limit with no burst capabilities. Traffic shaping eliminates burstiness, and guarantees that the long-term transmission rate will not exceed the configured rate. Traffic shaping smoothes traffic by storing traffic above the configured rate in a queue and hence may contribute to delay. Packets are lost due to shaping only when the queue is full Data error/loss concealment: Packet loss is caused by buffer overflow within network nodes and late packet arrival (buffer underflow) at the receiver. Total packet loss (access and core) should be minimized. Observing the loading constraint using some form of bandwidth broker or admission control will make packet loss probability negligible or avoided, allowing only for the residual background error rate which is randomly distributed. Packet loss has a significant impact on voice quality, even where Packet Loss Concealment is deployed. (1% random==5R approx.). Many packet loss models assume a random distribution of packet loss. However packet loss is intimately tied to jitter, both of which are governed by congestion, and jitter is bursty. Bursty packet loss makes it difficult even impossible to reconstruct the original packet sequence. For example, generally where more than 4 consecutive voice packets are lost, voice is muted (no voice playback). The distortion cause by packet loss is dependent on the codec, the packet size and the burst distribution. In practice, packet loss should be maintained <<1% to avoid it dominating voice quality. Packet Loss Concealment is effective at these low rates of loss, but not at higher rates because of their burstiness.

Echo and loudness level control: The degree to which echo impairs a conversation depends on a number of parameters. Several of the more influential factors are the level of echo returned to the talker (i.e. TELR) and the delay before the echo returns to the talker. Several other parameters contribute to a lesser extent, most of these by providing masking of the echo. These include: the sidetone level, room-noise, line noise, frequency shaping by the handset (or handsfree) acoustic path, and the hearing sensitivity of the talker. Thus, limits on TELR are defined in terms of delay and echo acceptability. By maintaining adequate TELR in consideration of delay, acceptable echo levels can be ensured.

Codec selection: Codec selection depends on a number of factors among which the link bandwidth constraints, the desired QoE, delay budget, interoperability and robustness to packet loss are the most important.

Transcoding stage: The manner in which the a call or other service is handled by the network elements may be one of the control knobs. For example, handoffs between networks (TDM/packet), compression of the traffic, and other factors associated with how the packets will be handled should be determined.

VAD (Voice Activity Detection) threshold: Silence suppression is one of the solutions to reduce bandwidth and increase the call throughput in packet networks. When silence suppression is used, talk-spurts are exponentially distributed which may cause congestion (or overloading) at the statistical multiplexer when multiple sources are active simultaneously.

The aggregate voice traffic with less than 24 users is very bursty. The advantage of VAD will be significantly diminished unless the bearer is burst tolerant (i.e. can accept a rt-VBR traffic contract with a high peak to mean variance and large burst tolerance). Below 24 users, if the bearer is burst-intolerant, then the aggregate may only be accommodated by setting the mean cell rate of the bearer to near the peak rate or by shaping the aggregate which adds further delay. Bandwidth saving in the order of 37% to 57% was achieved using silence suppression for a community size varying from 24 to 256 sources If the VAD algorithm implementation is not operating correctly it can decrease the intelligibility of voice signals and overall conversation quality. Excessive front end clipping, for example, can make it difficult to understand what is said. Excessive hold-over time can reduce network efficiency, and too little hold-over time can cause speech to "feel" choppy and unconnected, because the VAD cuts in during short speech pauses.

In previous section, we provided an inventory of QoS mechanisms and their impact on QoE. This classification differs from the more thorough QoS device abstract model developed by the IETF: QoS Device Datapath Model (QDDM) see: IETF RFC 3670, to enable the scalable management of QoS in multi-vendor IP networks. The QDDM abstract model is based on the following objects and relationships between them.

QoSService: high-level network service realized through special conditioning of traffic. It contains two sub-classes including FlowService for connection-oriented traffic and DiffservService for connectionless traffic where QoS is provided based on DiffServ PHBs.

ConditioningService: the sequence of traffic conditioning that is applied to a given traffic stream on the ingress interface through which it enters a device, and then on the egress interface through which it leaves the device. Multiple ConditioningService objects are used to implement a QoSService. The ConditioningService class has many sub-classes corresponding to specific traffic conditioning primitives including classifiers, meters, markers, droppers, queues, and schedulers.

FilterEntry: an object that identifies a specific traffic stream based on specific fields (IP header, MAC header, or other criteria).

FilterList: a sequence of FilterEntry objects which specifies a set of selection criteria that must be applied in sequence to identify a traffic stream.

ClassifierElement: a binding of a FilterList (given a traffic stream selection criteria) and of a subsequent traffic conditioning service.

MeterService: an object that monitors the time of arrival of packets in a stream and verifies its conformance with a traffic profile. The MeterService class has three sub-classes corresponding to different kinds of meters including average rate, exponential moving average, or token-bucket meters.

MarkerService: an object that marks specific fields in a network packet. The MarkerService class has many sub-classes including the PreambleMarkerService, TOSMarkerService, DSCPMarkerService, 802.1 QmarkerService.

DropperService: an object that selectively drops network traffic and invokes a subsequent conditioning services for packets that are not dropped. The DropperService class has many subclasses corresponding to different droppers including HeadTailDropperService (for head or tail drop), and REDDropperService (for RED droppers).

QueueingService: an object class that represents network queues.

PacketSchedulingService: an object class representing a scheduling service, i.e. a process to determine when packets must be removed from a set of queues and sent to an outgoing interface.

The QDDM objects may be used to implement a particular Quality of Service and thus may be used to adjust provision of service on the networks.

Voice: voice traffic is delay sensitive, with moderate variations of inter-packet times. Therefore, it must be scheduled with priority compared to other classes of traffic and a proper bandwidth allocation must be made for each voice session. This result may be obtained by using the following sequence of QDDM objects: (1) DSCPMarkerService: to mark the voice packets with the right DSCP at the source (2) ClassifierService: To identify the voice packets from the other packets based on their DSCP. The ClassifierService relies on a Filter object to identify voice packets based on their DSCP. (3) MeterService: to meter individual voice flows (4) DropperService: to drop packets from non-conformant voice flows. (5) SchedulerService: to schedule packets from voice queues ahead of other queues (e.g. best-effort or background queues), while avoiding the starvation of other queues with lower priorities. Also the SchedulerService must ensure that each voice flow receives enough service, and be fair among the different voice queues.

Video: the video service may be provided using a similar set of QDDM objects, i.e. DSCRPMarkerService, ClassifierService, MeterService, DropperService and SchedulerService.

Data: since best-effort and background traffic have unspecified QoS requirements, they require a subset of the QDDM mechanisms compared to voice and video, including a ClassifierService (e.g. to isolate best-effort and background traffic), a DropperService (to drop data packets in case of congestion) and a SchedulerService (e.g. to schedule best-effort traffic ahead of background traffic).

As described above, many different control knobs exist. One or more of these may be relevant for a particular service. The control knob selection software module 208 is provided with data relating to how a particular control knob affects operation of the network, and uses that data to select particular control knobs for a service based on the input defining parameters of the service as specified by the user to the QDM tool.

Once the service has been implemented on the network and is in use by customers, the QoE server may monitor the network (109) to determine if there are any QoE problems. Where the QoE server determines that the network is not in compliance with a SLA or otherwise is experiencing performance issues (110) the QoE server may revisit the capacity planning and dimensioning process (106) to determine if an upgrade to the network is warranted. Network monitoring and optimization is described in greater detail below in the section entitled "Network Monitoring and Control."

Figure 6:
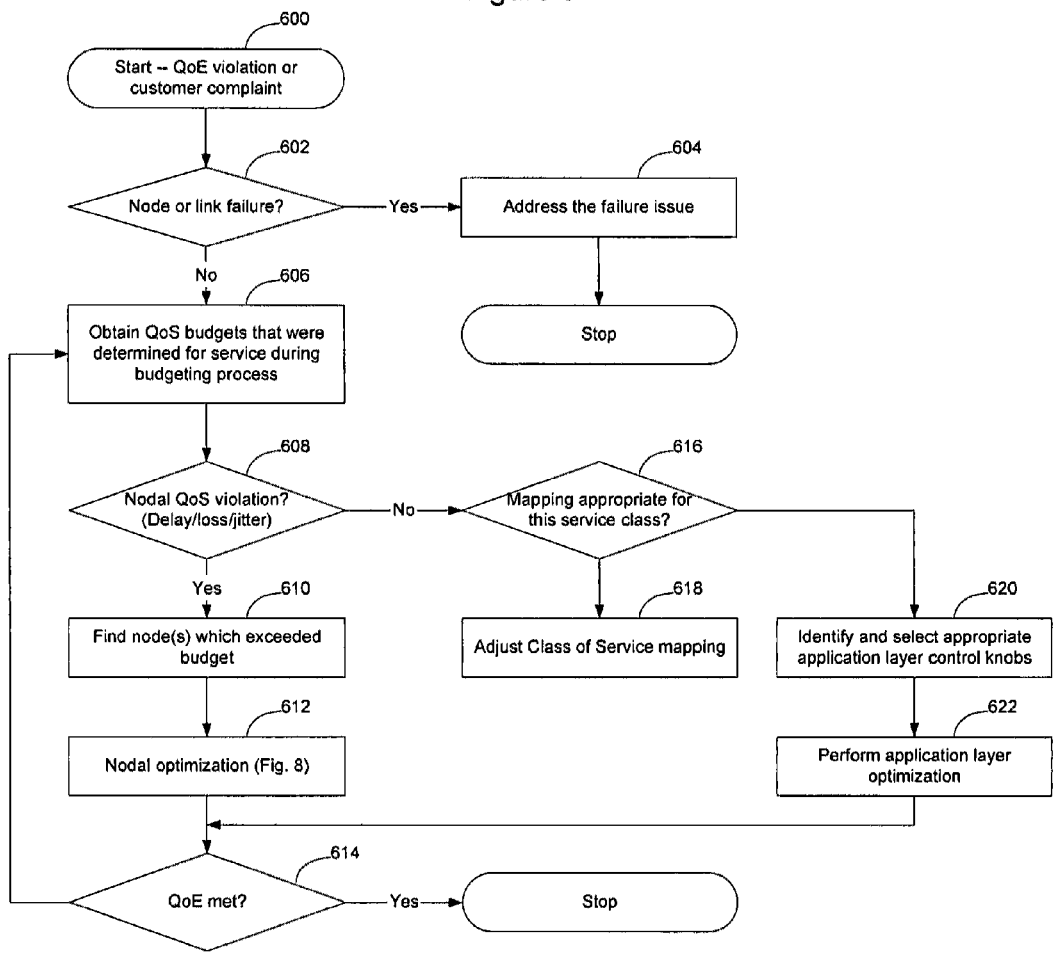
FIG. 6 is a flow diagram of a method of adjusting a network to achieve intended Quality of Experience according to an embodiment of the invention.

FIG. 6 shows a process that may be used to remedy QoE issues that arise while monitoring the network (600). As shown in FIG. 6, when a QoE violation or customer complaint is registered, the QoE server may determine if the complaint/violation stems from a node or link failure (602). If the failure is an equipment failure, the equipment failure should be fixed before modifying the service. Thus, if there is a node/link failure, the QoE server may cause the network to address the failure issue (604) and the process ends.

If the issue is not associated with a node/link failure, the QoE server will obtain the QoS budgets that were determined for the service during the budgeting process (606). Based on these QoS requirements, the QoE server will determine whether any node has violated its QoS requirement (608). Nodal QoS requirements may be associated with delay, loss, jitter, or other QoS specifications for the node. These specifications may also take into account the impairment allocations for the nodes for that service. If there are any nodal QoS violations, the QoE server will find the node that is exceeding its impairment budget (610) and optimize that node (612). Nodal optimization (612) is explained in greater detail below in connection with FIG. 7. Once nodal optimization has been implemented, the QoE server will determine if the overall QoE for the service has been met (614). If so, the process will end as the problem has been fixed. If not, the QoE server will iterate the process to attempt to find other nodes that require optimization.

If the QoE server does not find a nodal QoS violation at block 608, the QoE server will determine whether the QoE-QoS mapping was correctly performed to determine if the service is being mapped to the correct class of service on the network (616). If an incorrect class of service mapping has been performed, the QoE server will adjust the class of service mapping for the service.

If all of the nodes are implementing the correct QoS and the class of service was correct, and the network is still not implementing the correct QoE, then the network is set up incorrectly for that particular service and adjustment of the network is required. Accordingly, the QoE server will identify and select appropriate application layer control knobs for the service (620) and adjust the control knobs to perform application layer adjustment for the service (622). Once the application layer has been adjusted, the QoE server may check to determine if the adjustments have caused the QoE for the service to improve such that the QoE requirements are now met. If not, the process may iterate until the QoE server is able to meet the QoE requirements for the service.

Figure 7:
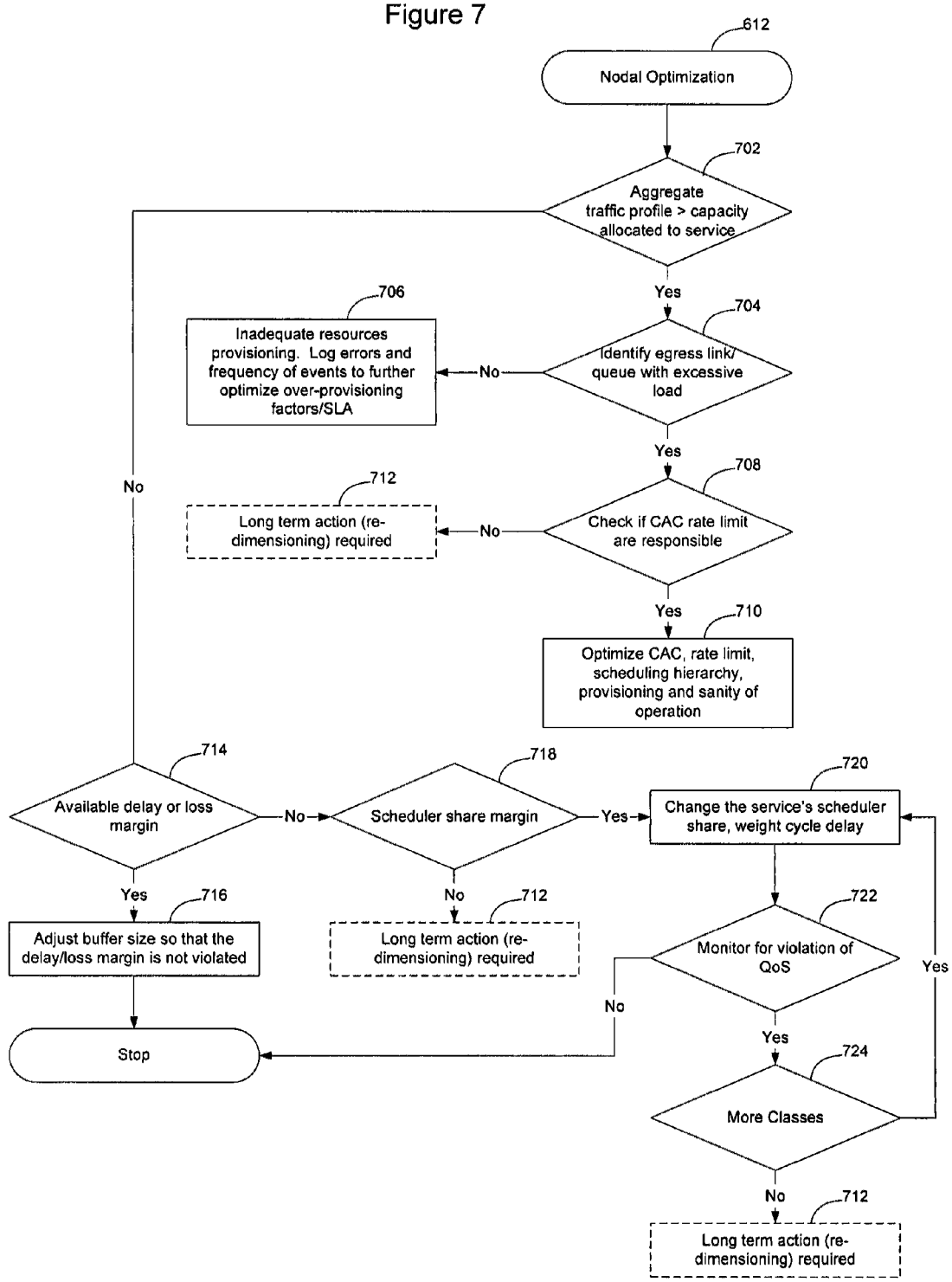
FIG. 7 is a flow diagram of a nodal optimization portion of the flow diagram of FIG. 6 according to an embodiment of the invention.

FIG. 7 illustrates a portion of the process of FIG. 6 that may be used to perform nodal optimization at block 612 of FIG. 6. Specifically, as shown in FIG. 7, the QoE server will first determine if the aggregate traffic on the node is higher than the capacity allocated for the service (702). If the aggregate traffic is higher than the capacity allocated for the service, the QoE server will determine if there is an egress link/queue with excessive load (704). If there is no link that has excessive load, then inadequate resources have been provisioned for the service. The errors may be logged and the frequency of the error monitored so that further optimization of the over-provisioning may be implemented based on the service level agreement (706).

If the QoE server determines that one or more of the nodes/links on the network is overloaded, the QoE server will look at the traffic to determine if that is the cause of the problem. For example, the QoE server may check the traffic profile, Call Admission Control (CAC), rate limit, scheduling hierarch, provisioning, and other factors (708). If one or more of these aspects is awry, the QoE server will optimize the CAC, rate limit, scheduling hierarchy, provisioning and other operational parameters, to reduce the amount of traffic at the node (710). If the traffic exceeds the capacity allocated for the service, and the profile of the traffic is not able to be adjusted to meet the QoS for the service, then long term action such as re-dimensioning of the service is required (712).

If the QoE server determines in block 702 that the aggregate traffic profile is not above the capacity allocated for the service, then the QoE server will determine whether it is able to adjust buffer size in the node for the service violating the QoS requirement. Specifically, the QoE server will determine whether there is available delay or loss margin (714). Larger buffers store larger amounts of data and, hence, may contribute to delay. On the other hand, smaller buffers are more likely to overrun and hence contribute to data loss for the service. If the service has available delay/loss margins, the QoE server may be able to adjust the buffer size provisioned to implement the service so that the QoE parameters associated with the delay/loss margins are not violated 716. If this fixes the QoE problem the process of nodal optimization will end.

If there is no available delay/loss margin, the QoE server will determine if it is possible to adjust the share of the scheduler allocated to the service without impacting other classes of traffic (718). Different classes of traffic are handled differently by a network element and the scheduler determines how much of each class of traffic will be handled by the network element and the relative priority of each class of traffic. For example, a network element may give preferential treatment and guarantee 10% of the bandwidth to traffic marked green, and 90% of available bandwidth to traffic marked yellow. These allocations may be adjusted to increase the amount of green traffic, for example, if there is margin in the share allocated to one or more of the other classes of traffic. There may be many different classes or only one class depending on how the network is implemented.

If there is no margin in any of the other classes, the traffic being handled by the node is not able to be adjusted in this manner and long term action such as re-dimensioning is required (712). If there is margin available in one of the other service classes, the QoE server will change the service's scheduler share and weight cycle delay (720) and monitor the node to determine if the node is violating the QoS (722). If the node is meeting the QoS requirements, the process of optimizing the node will terminate as the node has been optimized. If the node is still not meeting QoS requirements the QoE server will determine whether there are additional service classes that have available margin to see if the scheduler may be further adjusted (724). If so, the QoE server will use those classes to adjust the service's scheduler share further to see if the node may be optimized to meet required QoS. The process will iterate until the node meets the QoS requirements or there are no more service classes that are able to be adjusted. If, after adjusting the scheduler share amongst the various classes the node is not able to be adjusted to meet the QoE targets, long term action such as re-dimensioning of the service is required (712) and the process will stop.

The functions described above may be implemented as a set of program instructions that are stored in a computer readable memory and executed on one or more processors on the computer platform. However, it will be apparent to a skilled artisan that all logic described herein can be embodied using discrete components, integrated circuitry such as an Application Specific Integrated Circuit (ASIC), programmable logic used in conjunction with a programmable logic device such as a Field Programmable Gate Array (FPGA) or microprocessor, a state machine, or any other device including any combination thereof. Programmable logic can be fixed temporarily or permanently in a tangible medium such as a read-only memory chip, a computer memory, a disk, or other storage medium. All such embodiments are intended to fall within the scope of the present invention.

It should be understood that various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A method of operating a network based on quality of experience, the method comprising the steps of:
    determining, by a Quality of Experience server, that a Quality of Experience (QoE) violation associated with a service has occurred;
    determining, by the Quality of Experience server, if the QoE violation is due to an equipment failure;
    if the QoE violation is not due to an equipment failure, determining, by the Quality of Experience server, if the QoE violation is due to violation of an individual nodal Quality of Service (QoS) requirement by a node on the network, the individual nodal QoS requirement specifying how the node is required to operate to enable the service to be implemented on a network path through the network to enable the node to satisfy specified QoE requirements for the service; and
    if there has been a nodal QoS violation, performing, by the Quality of Experience server, nodal optimization to adjust the manner in which the node is handling traffic to attempt to meet the QoS requirements;
    if there has not been a nodal QoS violation, adjusting, by the Quality of Experience server, a class of service mapping for the service or identifying and selecting application layer control knobs for the service to enable the network to be adjusted to enable the Quality of Experience requirements for the service to be satisfied.

2. The method of claim 1, wherein the step of adjusting a class of service mapping for the service comprises determining if the service has been mapped to an appropriate class of service.

3. The method of claim 1, wherein nodal optimization comprises determining if an aggregate traffic profile for the service is greater than a capacity allocated to the service.

4. The method of claim 3, wherein nodal optimization comprises adjusting a scheduler share for the service.

5. The method of claim 3, wherein nodal optimization comprises adjusting a buffer size at the node so that a delay/loss margin for the service is not violated.

6. The method of claim 3 wherein the nodal Quality of Service (QoS) requirements are derived from a QoE allocation process for the service.

7. The method of claim 1, further comprising the step of:
if the QoE violation is due to an equipment failure, fixing the equipment failure before modifying the service.

8. A method of allocating an impairment budget on a network path, the network path extending through first nodes in a first network and second nodes in a second network, the method comprising:
determining, by a Quality of Experience server, a set of quality of service metrics to be implemented on the network path for a service to be offered on the network path, the set of quality of service metrics being based on a required set of quality of experience parameters for the service;
determining, by the Quality of Experience server, a total impairment budget for the network path based on the quality of service metrics, the total impairment budget specifying one or more upper bound thresholds for the quality of service metrics;
allocating, by the Quality of Experience server, a first portion of the total impairment budget to the first network and a second portion of the total impairment budget to the second network; and
dividing, by the Quality of Experience server, the first portion of the total impairment budget between the first nodes to arrive at individual impairment allocations for each of the first nodes, each individual impairment allocation for each node of the first nodes specifying a quality of service budget for the node, the quality of service budget specifying how the node is required to operate to enable the service to be implemented on the network path and meet the required set of quality of experience parameters for the service.

9. The method of claim 8, wherein the first network is an access network and the second network is a core network, and wherein the step of allocating comprises allocating the total impairment budget between the access network and the core network.

10. The method of claim 8, wherein the step of allocating comprises allocating at least one of the quality of service metrics.

11. The method of claim 10, wherein the allocated quality of service metric is latency.

12. The method of claim 11, further comprising the step of determining a fixed latency for each node on the network path in upstream and downstream directions.

13. The method of claim 12, further comprising the step of determining a variable latency for each node on the network path in upstream and downstream directions.

14. The method of claim 13, further comprising summing the downstream variable latency for the nodes on the network path and using the sum to determine a size of a jitter buffer for the service.

15. A method of designing or updating a network based on end-user Quality of Experience requirements for a service, the method comprising the steps of:
receiving, by a Quality of Experience server, a set of parameters defining a service to be offered on the network;
determining, by the Quality of Experience server, end-to-end Quality of Experience (QoE) requirements for the service from the set of parameters defining the service;
mapping, by the Quality of Experience server, the QoE requirements to Quality of Service (QoS) requirements for the service; and
using the Quality of Service requirements for the service to design or update the network to enable the network to satisfy the end-user Quality of Experience requirements for the service;
wherein the set of parameters defining the service include context independent parameters of the service and context dependent parameters of the service; and
wherein the step of determining end-to-end Quality of Experience (QoE) requirements for the service comprises using the set of parameters defining the service to key into a Quality of Experience database to obtain preferred and acceptable values for the service.

16. The method of claim 15, wherein the context independent parameters comprise at least one of timeliness of the service and media/modalities to be used to implement the service.

17. The method of claim 16, wherein the context dependent parameters comprise at least one of network scenario, contact type, transmission mode, connectivity type, and terminal type.

18. The method of claim 15, wherein the context independent parameters of the service are used to determine the preferred values for the service, and wherein the context dependent parameters of the service are used to adjust the preferred values to compute the acceptable values for the service.

19. The method of claim 15, wherein the QoE requirements comprise a comprehensive set of metrics for the media and control path for each modality associated with the service.

* * * * *